United States Patent [19]

Chapman

[11] 3,729,698

[45] Apr. 24, 1973

[54] TERMINAL INTERCONNECTIONS

[75] Inventor: Peter Frederick Chapman, Kent, England

[73] Assignee: Elliott Brothers (London) Ltd., London, England

[22] Filed: Jan. 25, 1971

[21] Appl. No.: 109,116

[30] Foreign Application Priority Data

Jan. 28, 1970 Great Britain....................4,127/70

[52] U.S. Cl...................339/18 R, 29/628, 339/121

[51] Int. Cl. ..........................................H01r 29/00

[58] Field of Search ..................317/101 CE; 339/18, 339/17 F; 200/86 R; 29/622, 628

[56] References Cited

UNITED STATES PATENTS 2,324,809 7/1943 Abbott et al. ..........................219/85

3,522,484 8/1970 Clements ..........................339/17 F

*Primary Examiner*—Charles W. Lanham
*Assistant Examiner*—James R. Duzan
*Attorney*—Kirschstein, Kirschstein, Ottinger & Frank

[57] ABSTRACT

A method of interconnecting alternate (for example) terminals in a row. An insulating flexible strip is woven in and out of the terminals to separate them into two groups. Terminals in the same group are interconnected by a strip of copper running along the terminals the strip being either a deposit on the insulating strip or a straight bar running along the outside of the terminals, according to the current carrying requirements. In the latter case the copper bar is soldered to its group of terminals by resistance heating the bar having expendable end portions to which connections are made.

9 Claims, 6 Drawing Figures

INVENTOR
PETER FREDERICK CHAPMAN
BY
ATTORNEYS

INVENTOR
PETER FREDERICK CHAPMAN
BY
[signature]
ATTORNEYS

INVENTOR
PETER FREDERICK CHAPMAN
BY
Kurtis, Kurtis, Ottinger & Frank
ATTORNEYS

TERMINAL INTERCONNECTIONS

This invention relates to terminal interconnections and particularly to a method of interconnecting a plurality of terminals when other terminals or conductors occur in between.

In electronic equipment generally, it frequently occurs that circuit modules are constructed as plug-in units, a number of such units fitting into an equipment rack which both supports the units in a predetermined position and provides plug-in terminal connectors for the circuits. Thus when the circuit unit is in position it is connected to other circuitry associated with the equipment rack. It will commonly occur that at least some of the terminal connections of the circuit modules have to be commoned, so that connections have to be made from one socket to the next and the next, et cetera, in the rack.

Examples of such equipment may be found particularly in the fields of data processing.

When large numbers of such interconnections have to be made, and particularly when, say, alternate terminal connections in a row have to be omitted from the interconnection, individual point to point wiring becomes time consuming and expensive.

According to the present invention, in a method of interconnecting a plurality of terminal connections at least some of which are separated by other terminal connections or conductors from which said plurality of terminal connections are required to be insulated, a strip of insulating material is positioned between the plurality of terminal connections and the other terminal connections, and a strip of conductive material is positioned alongside the strip of insulating material to make electrical contact with the plurality of terminal connections, the conductive strip being insulated from the other terminal connections by the strip of insulating material.

There may be a conductive strip on both sides of the insulating strip, the second conductive strip making contact with the other terminal connections. The strips of insulating and conductive materials may form a composite strip or may be separate, the terminal connections then being sandwiched between the strips of insulating and conductive materials.

Where the strips of insulating and conductive material are separate, the terminal connections are preferably soldered to the strip of conductive material by a method in which an electric current is passed through the strip of conductive material to heat it. The end portions of each strip of conductive material may be employed for heating current connections, these end portions being separated from the remainder of the strip by a preformed transverse indentation at which the adjacent-end portion is broken off after the terminal connections have been soldered to the strip. The end portions may also be of reduced width to increase the electrical resistance locally.

A further aspect of the invention is a terminal assembly manufactured in accordance with any of the above methods.

A further aspect of the invention is a rack for plug-in electrical equipment units the rack having a plurality of unit connectors each having a multiplicity of terminals arranged in columns, wherein at least some of the corresponding terminals in different columns are interconnected by any of the above methods.

A method of interconnecting the terminals of a number of plug-in connectors to be mounted in an equipment rack, will now be described, by way of example, with reference to the accompanying drawings, of which:

Figure 1:
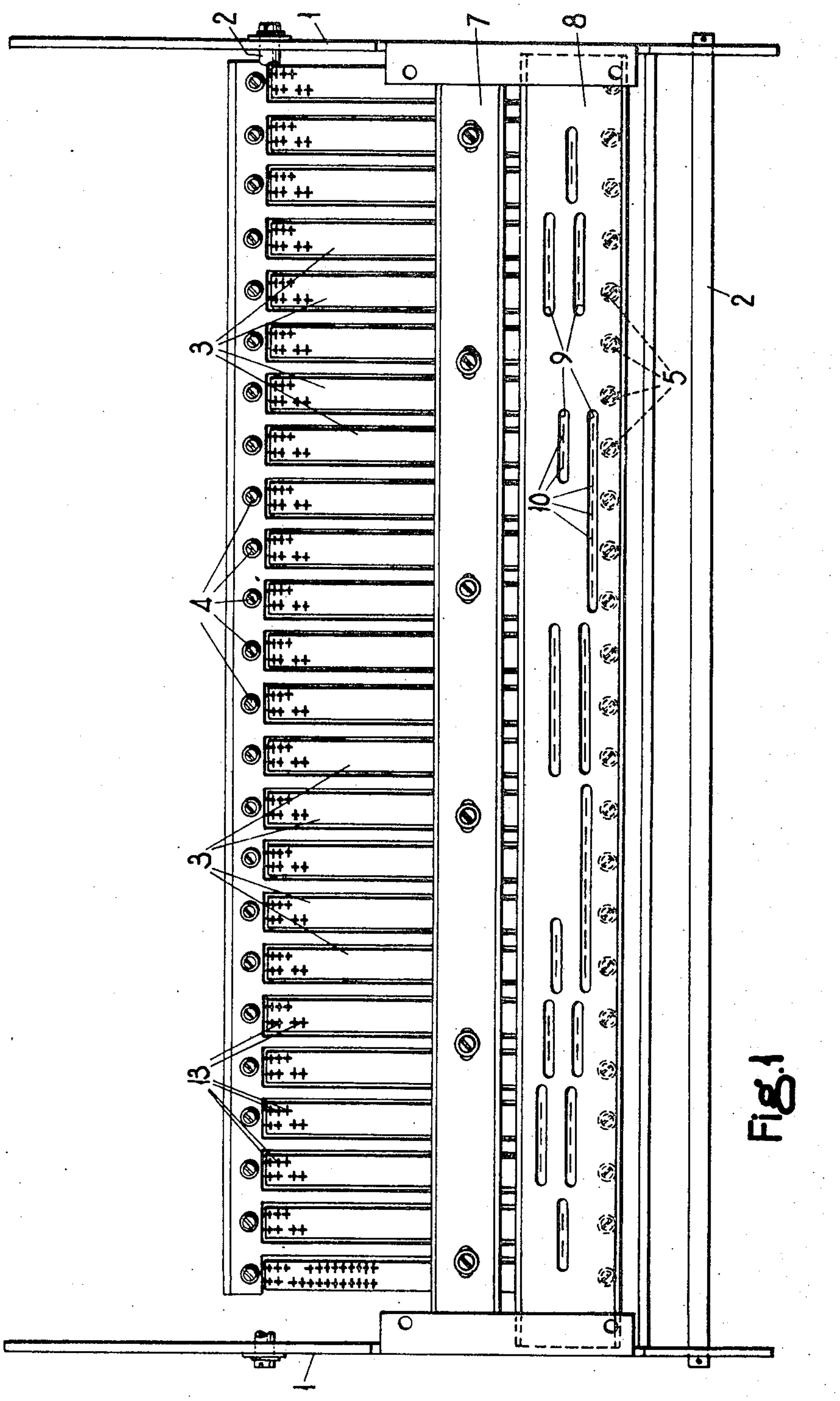
FIG. 1 is a partly broken away rear elevation of an equipment rack.

Referring to FIG. 1, an equipment rack comprises side walls 1 and cross members 2. Twenty four connectors 3 are mounted by screws 4 and 5 on a frame, these screws also fixing the frame and connectors 3 to frame members (not shown) fixed to the side walls 1. A bracket member 7 extends across all of the connectors to locate and support connector wiring. A plate 8 of flexible insulating material extends across the lower parts of the connectors. This plate has slots 9 which give access to bus-bar tags 10, various numbers of which can be seen in different slots. The plate 8 provides support for terminal connectors which clip on to the tags. It is the wires of these terminal connectors which are supported by the bracket member 7.

Each of the 24 connectors 3 comprises 43 pairs of terminals 13 in two columns. As the connectors 3 are regularly positioned, an array of terminals is provided in which there are 43 rows. In the equipment of the present example the upper 36 rows are concerned with signal circuitry and the lower seven rows with power supplies. In various ones of the signal rows the left-hand (from the front of the rack) terminal 13 of each connector 3 has to be connected to each other such left hand terminal. In other signal rows both the left-hand terminals and, separately, the right-hand terminals have to be connected. Again, in some signal rows one or more connectors may be omitted from the interconnections completely.

In the power-supply rows, in every row the left-hand terminals 13 have to be connected and, separately, the right-hand terminals 13 have to be connected. In addition, provision is made for external connections by way of the bus-bar tags 10 mentioned above.

Figure 2:
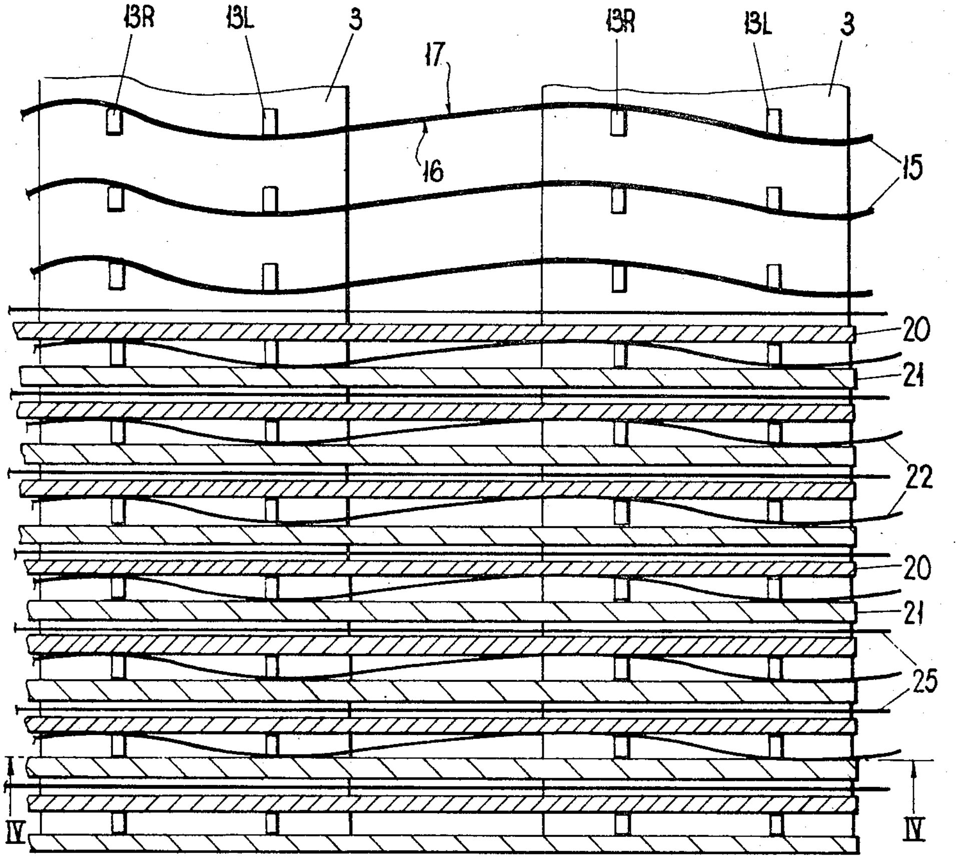
FIG. 2 is an enlarged view of the lower right-hand end portion of FIG. 1.
Figure 3:
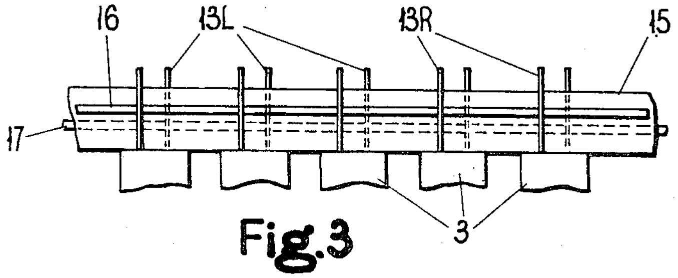
FIG. 3 is a partial underneath plan of a typical one of the upper rows in FIG. 2.

Referring now to FIGS. 2 and 3, in the upper part of FIG. 2 a part of the signal rows is shown. In each such row a strip 15 of poly-imide plastics material is woven in and out of the terminals 13 so insulating the left-hand terminals 13L from the right-hand terminals 13R. On each side of this strip 15 a conductive strip of copper, 16, 17 is fixed. These copper strips 16 and 17 are displaced from each other on the strip 15 to reduce the capacitance between them. They may be formed by completely coating the opposite faces of the strip 15 with sheet copper and etching away the unwanted parts.

It can be seen that the copper strip 17 makes contact with the left-hand terminals 13L while the copper strip 16 makes contact with the terminals 13R. The composite strip 15, 16, 17 has some resilience and because of the serpentine path that it follows, a slight contact pressure is applied between the copper strips 16 and 17 and the respective terminals 13L and 13R.

Similar strips 15, single or double sided according to the connection requirements, are positioned in other signal rows and, when all are in position, the assembly of connectors (which is removable as an assembly from the rack) is dipped in a flux bath, to clean the surfaces of the strips 16 and 17 and of the terminals 13, and then dipped in a solder bath. The terminals are thus soldered to their associated copper strips at all the points of contact. There is no fear of solder bridging the two copper strips 16 and 17 because of the lateral extent of the insulating strip 15 beyond the strips 16 and 17.

The cross-section of the copper strips 16 and 17 may be insufficient for the current requirements of a particular row. In this case broader copper strips 16 and 17 may be used. More space on the strip 15 is available if the reduced capacitance feature is sacrificed and the two strips 16 and 17 are superimposed (although, of course, still separated by the insulating strip 15). There remains the advantage that although the capacitance is not then as low as in the first arrangement, it is very closely fixed.

Figure 4:
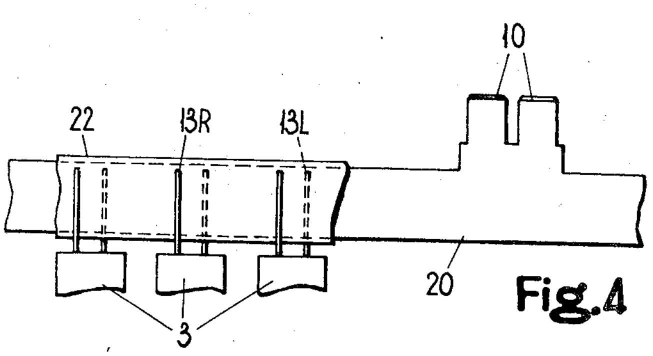
FIG. 4 is a partial underneath plan of a typical one of the lower rows in FIG. 2, such as, on the line IV—IV.
Figure 5:
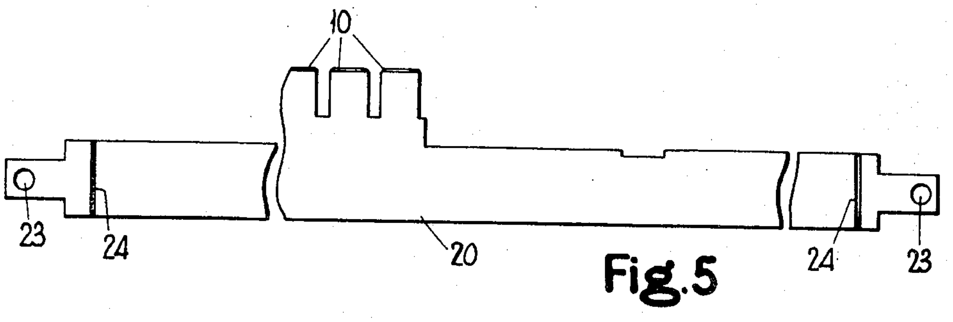
FIGS. 5 and 6 are underneath plan and a detail rear view of a single bus bar conductor such as shown in FIG. 4.

Referring now to FIGS. 2, 4 and 5 particularly, the power supply terminal rows shown in the lower part of FIG. 2 each require two heavy bus-bars 20 and 21, one to interconnect the left-hand terminals 13L and one for the right-hand terminals 13R. These bus-bars are substantially straight and rigid, one of them, 20, extending along above a row of terminals 13 and the other, 21, below the row.

The left and right-hand terminal groups are again separated by a strip 22 of insulating material woven in and out of the terminals of the row. However, in this case the strip, of glass fiber coated with P.T.F.E., need not be coated with a conductive strip of copper.

FIG. 5 shows a typical bus-bar 20. At an intermediate position along its length, varying with the bus-bar, as shown in FIG. 1, a number of bus-bar tags 10 protrude from the edge of substantially the same thickness as the bus-bar itself. The number of these tags 10 on a particular bus-bar depends upon the required current capacity of the bus-bar. The tags are gold plated to improve the contact with wire connectors (not shown) which are clipped onto them.

Figure 6:
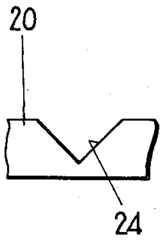

At each end of the bus-bar the width is reduced to approximately half and a terminal hole 23 is formed in the reduced portion. Adjacent to each reduced portion is a V-shaped groove 24 extending across the bus-bar. This groove is pressed into the copper bus-bar to a little more than half-way through the thickness and has the effect of local hardening of the copper which is then easy to break at the groove. The cross section of the groove 24 is shown in FIG. 6.

When the signal row connections have been made, as described above, the power-supply bus-bar connections are made as follows:

Each row of the bus-bar terminals is dealt with separately. A strip (not shown) of polytetrafluoroethylene (P.T.F.E.) is inserted on each side of the row in question. This strip is pressed down to the roots of the terminals and is of such a size that it can be pulled out lengthwise while engaging the terminals on both sides.

The woven strip of insulation 22 is positioned on the particular row of terminals but, as shown in FIG. 4, does not reach to the roots of the terminals because of the adjacent strips of P.T.F.E. A 'tinned' bus-bar, 20, 21, is placed on each side of the row of terminals with a strip of solder between it and the terminals. The right-hand ends of the bus-bars 20, 21 in FIG. 2 coincide with the positions of the V-shaped grooves 24 at this stage. The lower edges of the two bus-bars rest on their respective strips of P.T.F.E. which, having a circular cross-section, raise the lower-edges of the bus-bars slightly above the lower edge of the insulating strip 22 as shown in FIG. 4. The bus-bars 20 and 21 are clamped together at about six positions along their length by a form of 'bulldog' clip and connections are made to them at the terminal holes 23. A current is then passed through the two bus-bars in parallel until the strips of solder melt. The reduced end portions of the bus-bars have the effect of increasing the electrical resistance locally and increasing the heat generation accordingly to balance the greater loss at the ends. The reduced section at the grooves 24 has a similar effect.

Bridging of the insulating strip 22 by solder is prevented by the positioning of the strip off the connector bases and again by the upward displacement of the bus-bar from the lower edge of the insulating strip as shown in FIG. 4.

When the solder has melted and connected the bus-bar 20 to the left-hand terminals 13L and the bus-bar 21 to the right-hand terminals 13R, the electrical connections to the ends of the bus bars are removed. The bus-bar portions beyond the grooves 24 are then snapped off to the extent shown in FIG. 2. Removal of the protruding ends of the bus-bars in this way provides room for the clamp and terminal connections of the next pair of bus-bars.

As each pair of bus-bars is assembled, a strip of insulating material 25, similar to the strips 22, is assembled to one of the bus-bars.

The seven pairs of bus-bars of the power supply rows are thus connected sequentially leaving the arrangement shown in FIG. 2.

Finally, the assembly of FIG. 2 is fixed in the rack as in FIG. 1 and the plate 8 mounted over the protruding bus-bar tags 10.

It will be clear that the woven insulating strips 22 in the power supply rows could also be coated with copper to give a very slightly more positive interconnection, but the arrangement described will generally be preferable in the interests of economy.

Although the method has been described for the case of interconnections between alternate terminal connections, clearly this is not essential, the two groups of interconnected terminals being perhaps in pairs of threes. With the alternate arrangement however, there is, in the case of the signal rows, the advantage of an increased contact pressure, prior to soldering, between the terminals and the copper strips 16 and 17.

I claim:

1. In the manufacture of electronic equipment that constitutes a plurality of circuit module connectors each of which has at least one column of terminals and which connectors are mounted side by side so that corresponding terminals in successive columns constitute a row of terminals, a method of interconnecting selected terminals in at least one said row, in which method a. an individual strip of insulating material is positioned along said one row to separate said selected terminals on one side of said strip from the remaining terminals of the row on the other side of said strip, b. a strip of conductive material is positioned along said one row in electrical contact with said selected terminals and separated from said remaining terminals by said strip of insulating material, and c. said strip of conductive material is soldered to said selected terminals.

2. A method according to claim 1, wherein said strip of conductive material is deposited on said strip of insulating material and is soldered to said selected terminal pins by dip soldering.

3. A method according to claim 1, wherein said strip of conductive material is a substantially rigid bar and is positioned wholly on one side of said row of terminals, said selected terminals being sandwiched between said substantially rigid bar and said strip of insulating material.

4. A method according to claim 3 wherein said bar is soldered to said selected terminals by a method in which said bar is heated by the passage of an electric current between end portions of said bar, to which end portions electrical connections are made, a transverse indentation adjacent each of said end portions permitting the end portion to be broken off after said selected terminals are soldered to said bar.

5. A method according to claim 2, wherein, for each of a plurality of said rows, a respective strip of insulating material having a strip of conductive material deposited thereon is positioned to separate selected terminals on one side of said strip of insulating material from the remaining terminals of the row on the other side of said strip of insulating material, and all of said strips of conductive material are soldered to the selected terminals of their respective rows in a common dip-soldering operation.

6. A terminal assembly comprising a plurality of circuit module connectors for the plug-in reception of circuit modules, said connectors being mounted side by side and each of said connectors having at least one column of terminals, which together with the columns of terminals of the other said connectors, make up a rectangular array of terminals, corresponding terminals in successive columns constituting a row of terminals, each said row of terminals comprising selected terminals and the remaining terminals, a respective strip of insulating material in each row separating said selected terminals on one side of said strip from said remaining terminals on the other side of said strip, a strip of conductive material associated with each said strip of insulating material, said strip of conductive material being soldered to said selected terminals and separated from said remaining terminals by said strip of insulating material.

7. A terminal assembly according to claim 6, wherein at least one said strip of conductive material forms a composite strip with the associated said strip of insulating material.

8. A terminal assembly according to claim 6, and comprising two said strips of conductive material associated with each said strip of insulating material, the two strips of conductive material being soldered to said selected terminals and said remaining terminals respectively.

9. A terminal assembly according to claim 6, wherein said strip of conductive material is a substantially rigid bar positioned wholly on one side of said row of terminals, said selected terminals being sandwiched between said substantially rigid bar and said strip of insulating material.

* * * * *